R. ULLRICH.
EXPANSION JOINT.
APPLICATION FILED FEB. 12, 1919.
1,336,111. Patented Apr. 6, 1920.
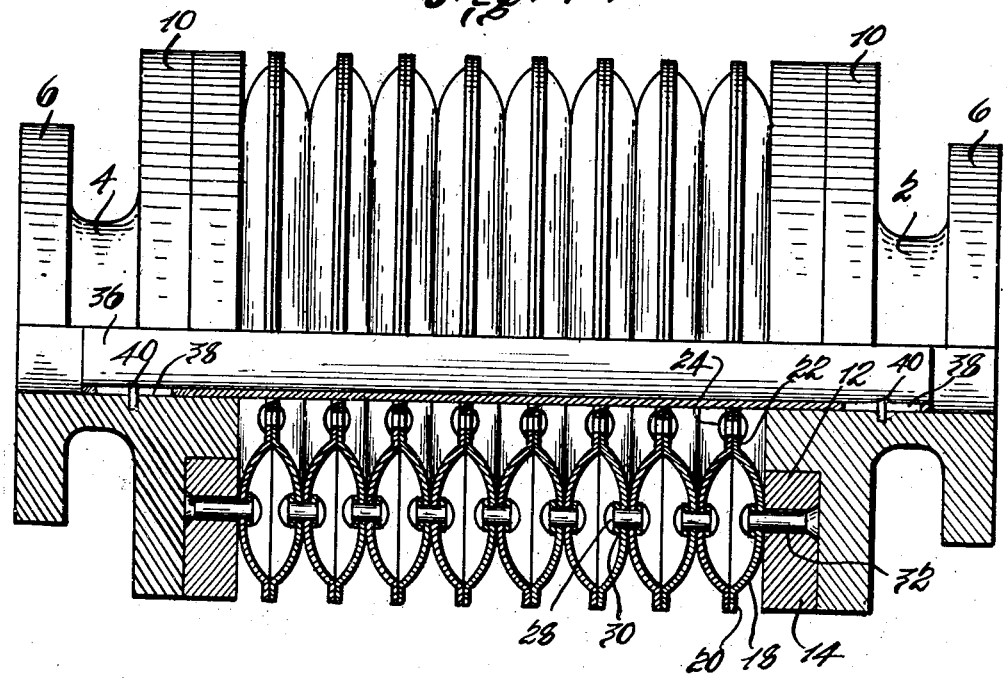
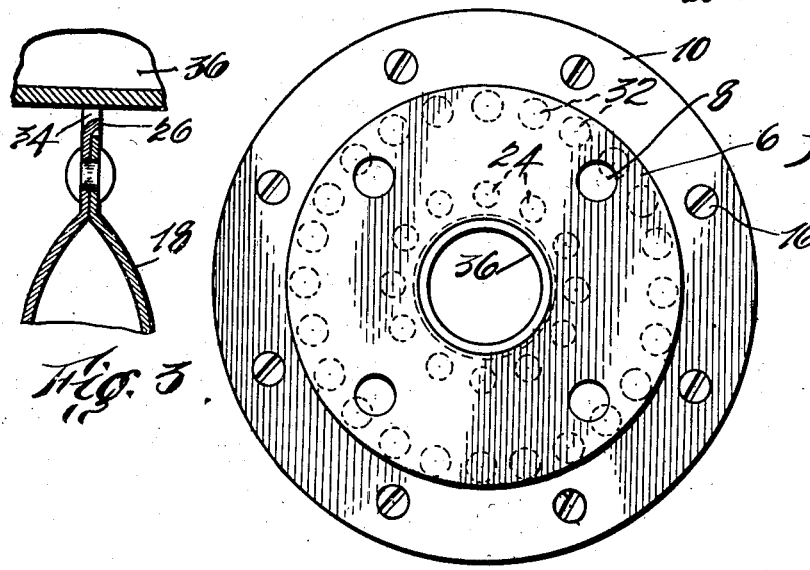
INVENTOR
Rudolf Ullrich
BY
ATTORNEY

UNITED STATES PATENT OFFICE.

RUDOLF ULLRICH, OF NEWBURGH, NEW YORK.

EXPANSION-JOINT.

1,336,111.  Specification of Letters Patent.  Patented Apr. 6, 1920.

Application filed February 12, 1919. Serial No. 276,592.

*To all whom it may concern:*

Be it known that I, RUDOLF ULLRICH, a citizen of the United States, residing at Newburgh, in the county of Orange and State of New York, have invented certain new and useful Improvements in Expansion-Joints, of which the following is a clear, full, and exact description.

This invention relates to expansion joints or couplings, and is herein shown as embodied in an expansion joint particularly adapted for use with pipes for conducting steam or liquid under high velocity, pressure or temperature. It will be understood, however, that many features of the invention have general utility both in this and other arts, and that the invention is not restricted in all its aspects to the illustrated embodiment or uses.

A general object of the invention is to provide a simple, compact and durable expansion joint construction which will perform its intended functions under all conditions of temperature and pressure within the ranges for which it is designed and which will have capacity for withstanding and compensating for pressure and temperature variations within relatively great ranges as compared with constructions heretofore known.

More particularly, the invention aims to provide an expansible and contractible, and preferably a resilient, connection between the joint ends of an expansion joint which will not be affected in its capacity to expand or contract by the pressure within the joint. The invention aims furthermore to provide an expansion joint construction in which the expansion or contraction will be distributed substantially uniformly throughout the length of the joint and in which such expansion and contraction will not effect a lateral distortion of the joint.

An important feature of the invention is the novel construction of the spring elements of which the expansible and contractible connection between the joint ends is composed, this spring construction being possibly of utility in relations and in structures other than those herein illustrated.

Other objects and important features of the invention will appear from the following description and claims when considered in connection with the accompanying drawings, in which—

Figure 1 is a view partly in side elevation and partly in longitudinal section of an expansion joint embodying the present invention;

Fig. 2 is an end view of the joint; and

Fig. 3 is a sectional detail on an enlarged scale.

The illustrated joint comprises a pair of joint ends 2 and 4 each having a flange 6 provided with bolt openings 8 by which it may be connected to a similar flange upon the pipe section to which it is to be joined or upon a collar carried by said pipe section. Each joint end also has a base portion 10 provided with an annular rabbet or shoulder 12 upon which fits a ring 14, to which one end of the expansible and contractible connection between the joint ends is connected. This ring may be attached to the base portion 10 of the joint end by any suitable means, as, for example, by the screws 16.

A very important feature of the invention is the novel construction of the resilient expansible and contractible connection between the joint ends, now to be described. This connection comprises a series of annular concave spring members 18 arranged in pairs with the concave faces opposed and with the margins 20 and 22 abutting, the inner margins 22 being preferably permanently united, as by rivets 24, and one of the inner margins being preferably bent over the other, as shown at 26 in Fig. 3 of the drawings.

Each of the spring pairs just described constitutes a complete expansible and contractible connection in itself, and the number of these interposed between the joint ends may be varied in accordance with the range of expansion and contraction desired for the joint. In the illustrated construction, eight of these spring pairs or sections have been provided, the abutting convex sides of the successive sections being preferably permanently united as by rivets 28 which may be headed against washers 30. The end sections are connected by rivets or other suitable connecting means 32 to the rings 14.

As shown in Fig. 3 of the drawings, the open space within the annulus of each section is preferably such that there is a clearance 34 between each spring section and a pipe or tube 36 which preferably extends through the expansible and contractible connection and into the joint ends 2 and 4 to provide a smooth straight passage for liquid or gas under high velocity. To prevent a shifting of the pipe or tube 36 beyond the inner edge of either joint end 2 or 4, any suitable lost motion connection may be provided between the pipe or tube 36 and the respective joint ends, as, for example, the pin 38 on the joint end projecting into the slot 40 in the pipe or tube 36.

From the foregoing description, the operation of the illustrated joint will be obvious. When pressure is exerted upon the two joint ends 2 and 4, the pressure will cause a substantially uniform compression of each of the sections or spring pairs, the outer margins 20 of the spring pairs moving outward together as the sides of the oval space between the springs are moved toward each other, these springs being preferably made of high grade spring steel, so that when the pressure is released the springs will carry the joint ends back to their original distance apart. Although in practical operation it is believed that the joint will expand and contract without substantial lateral distortion when the end sections are positively connected to the rings 14, if it is found desirable, provision may be made for a limited bodily relative movement of these sections and rings transverse to the axis of the joint.

It will be noted that the closed space between the spring members of each section will not be affected in any way by the pressure upon either the inner or outer side of the expansion joint, and thus the endwise expansion and contraction of the joint will not be affected by variations in pressure within the joint. It will also be noted that the novel spring construction herein shown is of such a nature that it can be utilized in other relations than that herein illustrated, particularly where it is desired to provide for rectilinear expansion or contraction without tendency in the spring itself to lateral distortion.

What I claim as new is:

1. An expansion joint comprising, in combination with the joint ends, an annular compressible member between said joint ends having opposed relatively movable walls which constantly meet at the inner and outer sides of the annulus to form an inclosed cavity within the annulus, said walls having respectively connections to the joint ends and having a positive connection to each other.

2. An expansion joint comprising, in combination with the joint ends, an annular resilient hollow, constantly closed, compressible member, of oval cross-section, located between said joint ends and having a connection to each joint end.

3. An expansion joint comprising, in combination with the joint ends, a series of connected annular, hollow, constantly closed, resilient members located between said joint ends and connected to each other and to said joint ends.

4. An expansion joint comprising, in combination with the joint ends, a resilient connection between said ends including an annular, hollow, resilient member having a peripheral slit providing abutting lips extending about said member.

5. In a device of the class described, a series of connected annular, hollow, resilient members, each having a peripheral slit providing abutting lips extending about said member, said members being arranged in axial alinement.

6. An expansion joint comprising, in combination with the joint ends, annular spring members having abutting margins and opposed concavities between said margins.

7. An expansion joint comprising, in combination with the joint ends, annular spring members having abutting margins and opposed concavities between said margins, and means for securing together the margins abutting upon one side of said concavities.

8. An expansion joint comprising, in combination with the joint ends, annular spring members having abutting margins and opposed concavities between said margins, and means for securing together the inner abutting margins of said members.

9. An expansion joint comprising, in combination, a plurality of abutting sections, each formed of a pair of annular spring members having abutting margins and opposed concavities between said margins, the abutting margins upon one side of each section being united, and the abutting parts of successive sections being also united.

10. An expansion joint comprising, in combination, a plurality of annular, hollow, double-convex sections, each having an annular split providing abutting lips in its periphery.

11. In a device of the class described, a series of pairs of annular concave springs having their concave faces opposed and abutting at both margins, and having the margins which abut upon one side of said concavities permanently secured together.

12. In a device of the class described, a series of connected annular concave springs arranged with the concavities of successive springs faced in opposite directions; the adjacent springs which have the concavities opposed abutting at the margins and the adjacent springs which have the convexities opposed abutting at the points of greatest convexity, the abutting margins upon the peripheries of the springs being unconnected.

13. An expansion joint comprising, in combination with the joint ends and with an integral connecting tube arranged to slide in and relatively to said ends, a resilient connection between said ends including an annular, hollow, resilient member surrounding said tube and compressible lengthwise of said tube.

14. An expansion joint comprising, in combination with the joint ends and with an integral connecting tube arranged to slide in and relatively to said ends, a resilient connection between said ends including an annular, hollow, resilient member surrounding said tube and concentrically spaced therefrom and compressible lengthwise of said tube.

15. An expansion joint having, in combination with the joint ends, a compressible member comprising a hollow resilient annulus located between, substantially coaxial with, and having positive connections to said joint ends.

Signed at Newburgh, New York, this 8 day of February, 1919.

RUDOLF ULLRICH.

Witness:
JOHN J. PERROTT.